US010055063B2

(12) United States Patent
North et al.

(10) Patent No.: US 10,055,063 B2
(45) Date of Patent: *Aug. 21, 2018

(54) SYSTEM AND METHOD FOR UTILIZING FINGERPRINTS AS USER INPUTS

(71) Applicant: DELL PRODUCTS, LP, Round Rock, TX (US)

(72) Inventors: Travis C. North, Cedar Park, TX (US); Austin M. Shelnutt, Leander, TX (US); Christopher M. Helberg, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,298

(22) Filed: Apr. 21, 2017

(65) Prior Publication Data

US 2017/0228056 A1  Aug. 10, 2017

Related U.S. Application Data

(63) Continuation of application No. 14/471,545, filed on Aug. 28, 2014, now Pat. No. 9,652,061.

(51) Int. Cl.
*G06F 3/042* (2006.01)
*G06K 9/00* (2006.01)

(52) U.S. Cl.
CPC ............ *G06F 3/042* (2013.01); *G06K 9/0004* (2013.01); *G06K 9/00087* (2013.01); *G06F 2203/04104* (2013.01)

(58) Field of Classification Search
CPC ....... G06F 3/042; G06F 3/041; G06K 9/0004; G06K 9/00087
USPC .......................................................... 345/175
See application file for complete search history.

(56) References Cited

U.S. PATENT DOCUMENTS

| | | | |
|---|---|---|---|
| 9,245,166 B2 | 1/2016 | Huang et al. |
| 2003/0091724 A1 | 5/2003 | Mizoguchi |
| 2005/0238214 A1 | 10/2005 | Matsuda et al. |
| 2007/0197261 A1 | 8/2007 | Humbel |
| 2008/0298646 A1 | 12/2008 | Wennergren |
| 2009/0102604 A1 | 4/2009 | Madhvanath et al. |
| 2009/0169070 A1 | 7/2009 | Fadell |
| 2013/0129162 A1 | 5/2013 | Cheng et al. |
| 2014/0140587 A1 | 5/2014 | Ballard et al. |
| 2014/0184549 A1 | 7/2014 | Cheng et al. |
| 2014/0230049 A1 | 8/2014 | Fadell et al. |

*Primary Examiner* — Fred Tzeng
(74) *Attorney, Agent, or Firm* — Larson Newman, LLP

(57) ABSTRACT

An information handling system includes a tablet computer, which in turn includes a touch sensor, a sensor detector, and a processor. The sensor detector is configured to communicate with the touch sensor, and to detect a first fingerprint on the touch sensor. The processor is configured to communicate with the sensor detector, to determine that the first fingerprint is within a first zone of the touch sensor, to match the first fingerprint to a stored fingerprint for the first zone of the touch sensor, to determine a first input function associated with the first fingerprint based on the first fingerprint matching the stored fingerprint for the first zone, and to execute the first input function.

20 Claims, 6 Drawing Sheets

SYSTEM AND METHOD FOR UTILIZING FINGERPRINTS AS USER INPUTS

CROSS-REFERENCE TO RELATED APPLICATION

This application is a continuation of U.S. patent application Ser. No. 14/471,545 entitled "System and Method for Utilizing Fingerprints as User Inputs," filed on Aug. 28, 2014, now U.S. Pat. No. 9,652,061, the disclosure of which is hereby expressly incorporated by reference in its entirety.

FIELD OF THE DISCLOSURE

This disclosure generally relates to information handling systems, and more particularly relates to utilizing fingerprints as user inputs to an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system, such as a tablet computer, can include a virtual keyboard for receiving input functions to be performed by the tablet computer. For example, a user can utilize a virtual keyboard presented on a display screen of the tablet computer to compose an electronic mail message, compose a word processing document, perform actions during a video game application, or the like.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
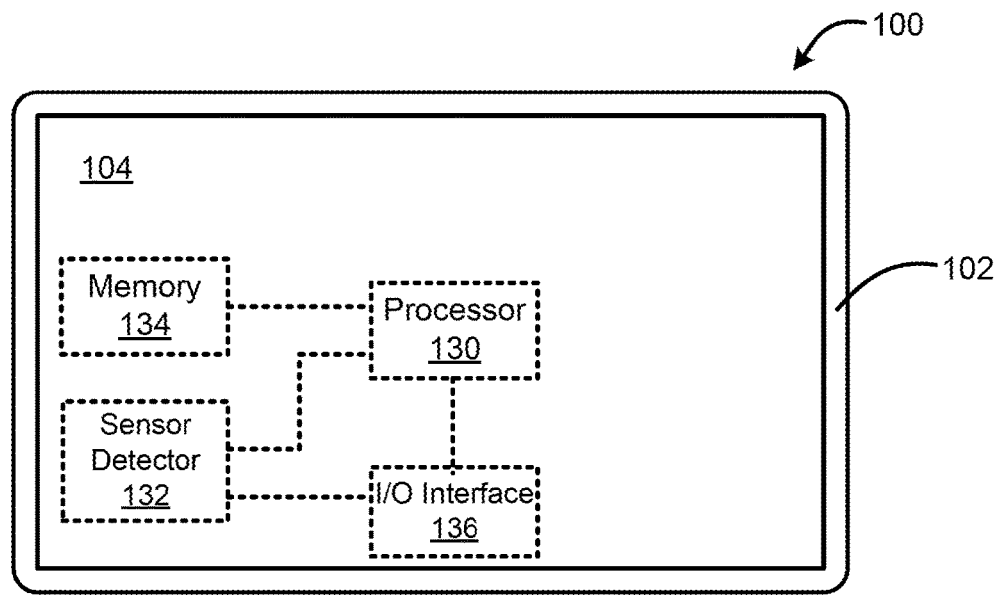
FIG. 1 is a diagram of a front view of a tablet computer.
Figure 2:
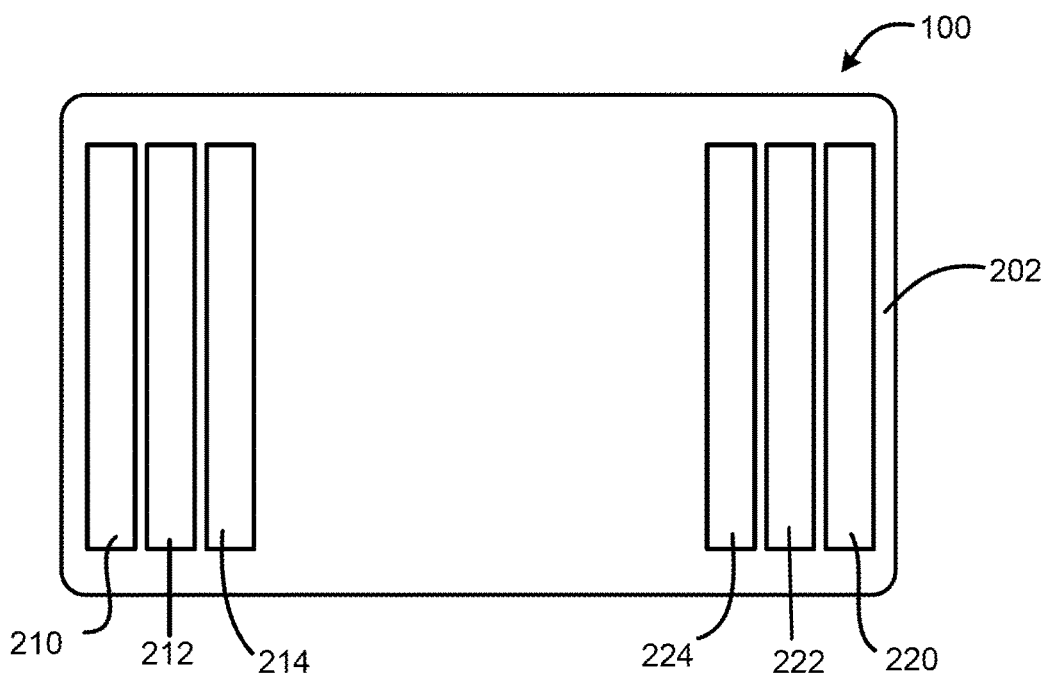
FIG. 2 is a diagram of a rear view of an embodiment of the tablet computer.

FIGS. 1 and 2 show an information handling system in the form of a tablet computer 100. The tablet computer includes a front panel 102 and a display screen 104. The tablet computer 100 internally includes a processor 130, a sensor detector 132, a memory 134, and an input/output interface 136. In an embodiment, the memory 134 can be any type of non-volatile memory, such as flash memory. The input/output interface 136 can be any combination of a dock interface, a Bluetooth module, a wired or wireless Internet Protocol module, or the like. The processor 130 is in communication with the sensor detector 132, the memory 134, and the I/O interface 136. The sensor detector 132 is also in communication with the I/O interface 136.

As shown in FIG. 2, the tablet computer 100 also includes a back surface 202, a first group of touch sensors 210, 212, and 214, and a second group of touch sensors 220, 222, and 224. Each of the touch sensors 210-214 and 220-224 can be any type optical sensor capable of scanning a fingertip place on the touch sensor, and thereby receiving or detecting a fingerprint. The sensor detector 132 is in communication with each of the touch sensors 210-214 and 220-224. However, for simplicity the communication channels connecting the sensor detector 132 to the touch sensors 210-214 and 220-224 have not been shown. The sensor detector 132 can identify each of the touch sensors 210-214 and 220-224 as an individual zone of that touch sensor. For example, a fingerprint detected anywhere in touch sensor 210 can be identified by sensor detector 132 as being located in a zone of touch sensor 210.

The tablet computer 100 can be placed in a training mode to set user fingerprints to input functions for the tablet computer. Once the training mode is initiated, the user can place one of his or her fingers on one of the touch sensors, such as touch sensor 210, which in turn can scan the fingerprint and send the detected fingerprint to the sensor detector 132. Upon receiving the fingerprint, the sensor detector 132 can determine what touch sensor, such as touch sensor 210, the fingerprint was received from and then send the fingerprint along with a touch sensor identifier to the processor 130. The processor 130 can then determine whether the detected fingerprint is already associated with the determined touch sensor and stored in the memory 134. For example, the processor 130 can access memory 134 and determine whether the detected fingerprint is already associated with touch sensor 210.

If the fingerprint is already associated with touch sensor 210, the processor can determine the input function to be performed when the fingerprint is detected on that touch sensor. In an embodiment, the input function can be an alphanumeric key input of a keyboard, a space key input, any other input key from a keyboard, an action in a video game application running on the tablet computer 100, a sequence of actions, or the like. The processor 130 can then provide a message, on display screen 104, to the user indicating that the fingerprint is already associated with touch sensor 210, and to identify the current input function to be performed when the fingerprint is detected in the touch sensor 210. The processor 130 can also provide the user with a graphical user interface (GUI) on the display screen 104 to enable the user to change the input function to be performed when the fingerprint is detected in touch sensor 210. Upon the user either re-saving the current input function or saving a new input function for the fingerprint in touch sensor 210, the processor 130 can provide a message to the user indicating that a new fingerprint can be received, and the substantially same process can be performed or the user can exit the training mode.

However, if the fingerprint is not already associated with or mapped to touch sensor 210, the processor 130 can provide the GUI on the display screen 104 to enable the user to select an the input function to be performed when the fingerprint is detected in touch sensor 210. Upon the user selecting and saving an input function for the fingerprint in touch sensor 210, the processor 130 can provide a message to the user indicating that a new fingerprint can be received, and the substantially same process can be performed or the user can exit the training mode. In an embodiment, the user can repeat this process until the user has stored a desired number of fingerprints for any combination of the touch sensors 210-214 and 220-224.

In an embodiment, the training mode can be universal across every application executed in the tablet computer 100, such that the same fingerprint detected in the same touch sensor can be the same input function for all applications executed in the tablet computer. In another embodiment, the training mode can be different for each application or can include an option to select particular applications to assign the detection of a fingerprint in a touch sensor to a particular input function to be performed, such that one fingerprint in the same touch sensor can be different input functions depending on the application executing in the tablet computer 100. For example, the user can select that a particular fingerprint detected in touch sensor 220 is the alphanumeric character 'a' while the tablet computer 100 is executing a word processing application, a text messaging application, an electronic mail application, or the like. However, the same fingerprint detected in the touch sensor 220 is a jump input function while the tablet computer 100 is executing a video game application.

During normal operation, a user can hold the tablet computer 100 in such a way that the user's fingers wrap around the tablet computer and rest near the touch sensors 210-214 and 220-224 on the back surface 202. The user can also hold the front surface 102 of the tablet computer 100 with his or her thumbs to securely hold the tablet computer. The user can then use his or her fingerprints on the touch sensors 210-214 and 220-224 to perform different actions in an application running on the tablet computer 100. For example, the tablet computer 100 may be executing an electronic mail application and the user can utilize each of his or her fingerprints in the different touch sensors 210-214 and 220-224 to input different alphanumeric character while composing an electronic mail message.

A touch sensor, such as touch sensor 212, can detect a fingerprint and can provide the fingerprint to the sensor detector 132, which in turn can determine that the fingerprint was detected at touch sensor 212. The sensor detector 132 can then provide the fingerprint and touch sensor identification, such as an identification of touch sensor 212, to the processor 130, and the processor can determine an input function to perform based on the fingerprint and the touch sensor identification. The processor 132 can access memory 134 to determine the input function to perform by correlating the fingerprint with the touch sensor 212. For example, the processor 130 can determine that the detected fingerprint in touch sensor 212 is associated with the alphanumeric character 't', and the processor can then perform the input function by outputting the letter T in the electronic mail application. The processor 130, sensor detector 132, memory 134, and touch sensors 210-214 and 220-224 can continue to communicate while the user is pressing his or her fingertips to the touch sensors to determine different input functions to execute as described above until the user exits the application, such as an email application, executing in the tablet computer 100.

Figure 3:
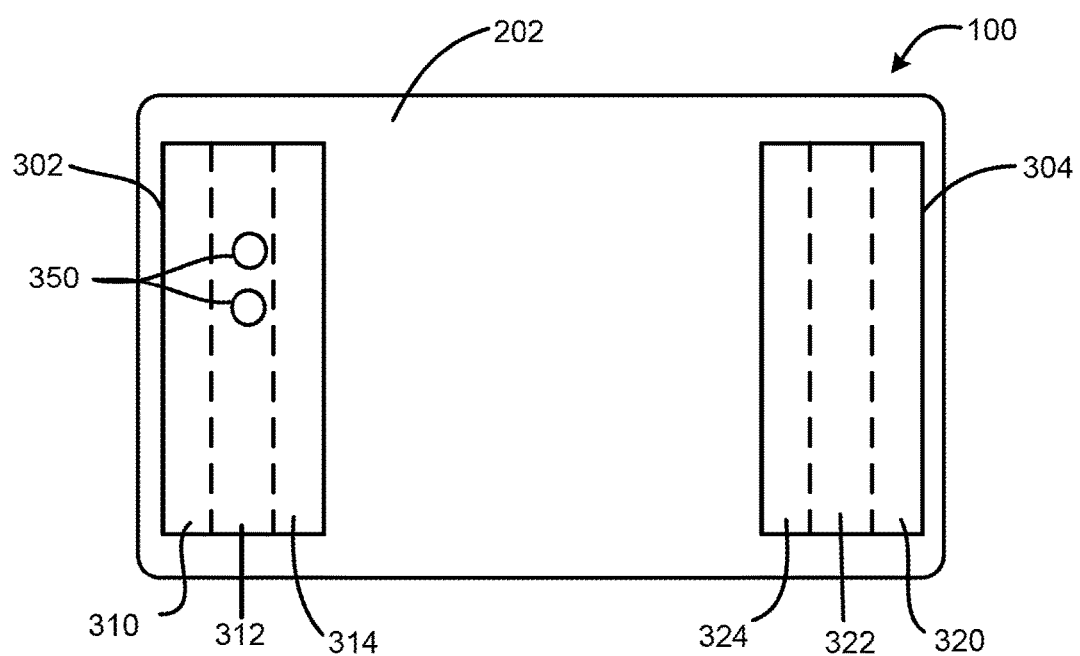
FIG. 3 is a diagram of a rear view of another embodiment of the tablet computer.

FIG. 3 shows a rear view of another embodiment of the tablet computer 100. As shown in FIG. 3, the rear surface 202 includes touch sensors 302 and 304, and each of the touch sensors include one or more zones. For example, touch sensor 302 includes zones 310, 312, and 314, and touch sensor 304 includes zones 320, 322, and 324. The sensor detector 132, shown in FIG. 1, is in communication with each of the touch sensors 302 and 304. However, for simplicity the communication channels connecting the sensor detector 132 to the touch sensors 302 and 304 have not been shown.

The touch sensors 302 and 304 can be different touch sensors that each has continuous zones without any gaps in the touch sensor. In an embodiment, the size of each of the zones of a touch sensor can dynamically vary between uses of the tablet computer 100. For example, zone 312 can always be in between zones 310 and 314 of touch sensor 302, but the size of each of the zones can vary based different factors, such as the size of the user's hands, how the user holds his or her hands on the tablet computer 100, or the like.

In an embodiment, the user can provide a multiple touch event 350 as an input on one of the touch sensors, such as touch sensor 302. For example, as shown in FIG. 3, the multiple touch event 350 can be two or more fingerprints detected at substantially the same time on the touch sensor 302. The sensor detector 132 can receive the multiple touch event 350 from the touch sensor 302 and determine the location of the multiple touch event on the touch sensor. The sensor detector 132 can then assign or set different zones in the touch sensor 302 based on the location of the multiple touch event 350. In an embodiment, the sensor detector 132 can set zone 312 to have a vertical orientation within touch sensor 302 and to include the location of the multiple touch event 350. The sensor detector 132 can then assign or set zone 310 to include a region of the touch sensor 302 in between zone 312 and an edge of the touch sensor toward an edge of the back surface 202, and can assign or set zone 314 to include the remaining region of the touch sensor 302, such as in between zone 312 and an edge of the touch sensor toward the middle of the back surface. The sensor detector 132 can also receive a multiple touch event 350 on the touch sensor 304 and assign or set the zones for touch sensor 304 in substantially the same manner, such that zone 322 is centered around the location of the multiple touch event, and zones 320 and 324 are located on opposite sides of zone 322 within touch sensor 304.

The tablet computer 100 can then be placed in a training mode or normal operation mode. In training mode, the user can place one of his or her fingers on one of the touch sensors, such as touch sensor 304, which in turn can scan the fingerprint and send the detected fingerprint to the sensor detector 132. Upon receiving the fingerprint, the sensor detector 132 can determine what zone of a touch sensor, such as zone 320 of touch sensor 304, the fingerprint was received from and then send the fingerprint along with a touch sensor zone identifier to the processor 130. The processor 130 can then determine whether the detected fingerprint is already associated with the determined touch sensor zone and stored in the memory 134. For example, the processor 130 can access memory 134 and determine whether the detected fingerprint is already associated with zone 320 of touch sensor 304.

If the fingerprint is already associated with touch sensor 210, the processor can determine the input function to be performed when the fingerprint is detected on that touch sensor. The processor 130 can then provide a message, on display screen 104, to the user indicating that the fingerprint is already associated with zone 320 of touch sensor 304, and to identify the current input function to be performed when the fingerprint is detected in zone 320 of touch sensor 304. The processor 130 can also provide the user with the GUI on the display screen 104 to enable the user to change the input function to be performed when the fingerprint is detected in zone 320 of touch sensor 304. Upon the user either re-saving the current input function or saving a new input function for the fingerprint in zone 320 of touch sensor 304, the processor 130 can provide a message to the user indicating that a new fingerprint can be received, and the substantially same process can be performed or the user can exit the training mode.

However, if the fingerprint is not already associated with or mapped to zone 320 of touch sensor 304, the processor 130 can provide the GUI on the display screen 104 to enable the user to select an the input function to be performed when the fingerprint is detected in zone 320 of touch sensor 304. Upon the user selecting and saving an input function for the fingerprint in zone 320 of touch sensor 304, the processor 130 can provide a message to the user indicating that a new fingerprint can be received, and the substantially same process can be performed or the user can exit the training mode. In an embodiment, the user can repeat this process until the user has stored a desired number of fingerprints for any combination of the zones 310-314 of touch sensor 302 and zones 320-324 of touch sensor 304.

During normal operation, a user can hold the tablet computer 100 in such a way that the user's fingers wrap around the tablet computer and rest near the touch sensors 302 and 304 on the back surface 202. The user can also hold the front surface 102 of the tablet computer 100 with his or her thumbs to securely hold the tablet computer. The user can then perform a multiple touch event 350 on both touch sensors 302 and 304 to cause the sensor detector 132 to assign or set the zones within the touch sensors. The assigned zones can continue to be mapped to the input functions selected during the training mode no matter where the current boundaries for the zones are assigned. For example, if the multiple touch event 350 results in the sensor detector 132 shifting zone 312 left or right on the touch sensor 302, the processor 130 will continue to map the same input functions to the zone, because the sensor detector can provide the zone and touch sensor identification to the processor.

A touch sensor, such as touch sensor 302, can detect a fingerprint and can provide the fingerprint to the sensor detector 132, which in turn can determine that the fingerprint was detected at zone 314 of touch sensor 302. The sensor detector 132 can then provide the fingerprint along with the touch sensor identification, such as an identification of zone 314 of touch sensor 302, to the processor 130, and the processor can determine an input function to perform based on the fingerprint and the touch sensor identification. The processor 132 can access memory 134 to determine the input function to perform by correlating the fingerprint with zone 314 of touch sensor 302. For example, the processor 130 can determine that the detected fingerprint in zone 314 of touch sensor 302 is associated with a jump action in a video game application executing in tablet computer 100, and the processor can then perform the input function.

Figure 4:
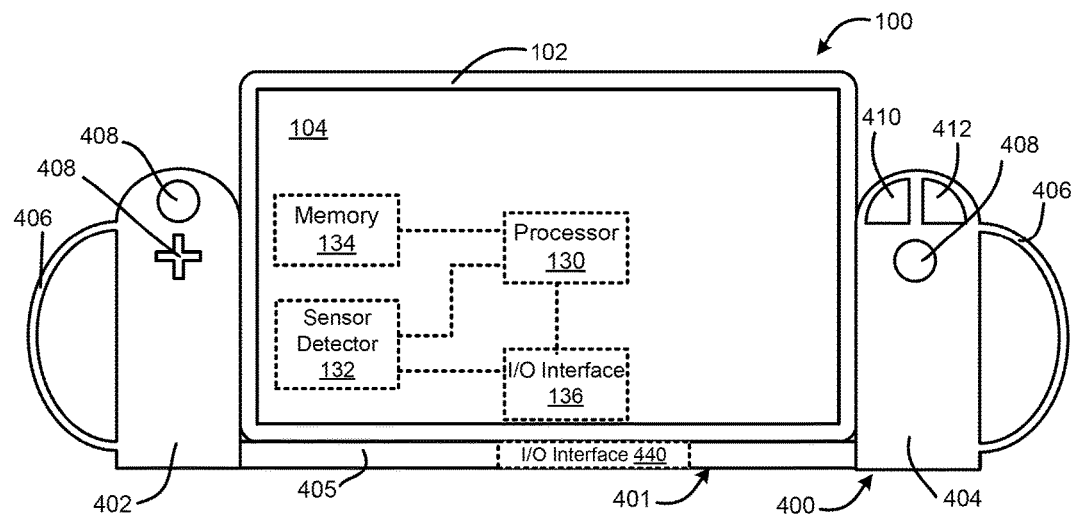
FIG. 4 is a diagram of a front view of the tablet computer and a dock.
Figure 5:
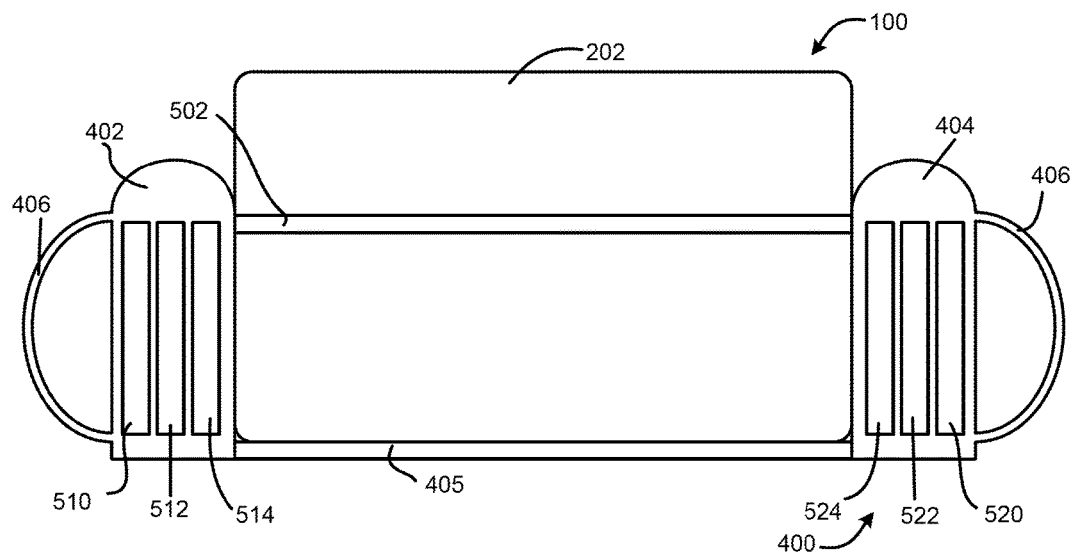
FIG. 5 is a diagram of a rear view of the tablet computer and the dock.

FIGS. 4 and 5 show respective front and rear views of the tablet computer 100 and a dock 400. As shown in FIG. 4, the dock 400 includes a cradle 402, and handles 402 and 404. The cradle 401 includes a bottom rail 405 and a top rail 502 (shown in FIG. 5). The handle 402 includes a loop 406 and control inputs 408. The handle 404 includes a loop 406, a control input 408, and touch sensors 410 and 412. The tablet computer includes a front panel 102 and a display screen 104. The tablet computer 100 internally includes a processor 130, a sensor detector 132, a memory 134, and an input/output interface 136. The dock 400 internally includes an I/O interface 440 to communicate with the I/O interface 136 of the tablet computer 100. The input/output interfaces 136 and 440 can be any combination of a dock interface, a Bluetooth module, a wired or wireless Internet Protocol module, or the like. As shown in FIG. 5, the handle 402 includes touch sensors 510, 512, and 514, the handle 504 includes touch sensors 520, 522, and 524, and the tablet computer 100 includes a back surface 202 in physical communication with top rail 502 of the cradle 401. The I/O interface 440, shown in FIG. 4, is in communication with each of the control inputs 408, and with each of the touch sensors 410, 412, 510-514, and 520-524. However, for simplicity the communication channels connecting the I/O interface 440 with each of the control inputs 408, and with each of the touch sensors 410, 412, 510-514, and 520-524 have not been shown.

The tablet computer 100 and dock 400 can be placed in a training mode to set user fingerprints on the touch sensors 410, 412, 510-514, and 520-524 of the dock to input functions for the tablet computer. Once the training mode is initiated, the user can place one of his or her fingers or thumbs on one of the touch sensors, such as touch sensor 410, which in turn can scan the fingerprint and send the detected fingerprint to the sensor detector 132 via the I/O interfaces 440 and 136. As used herein, a fingerprint can be both the unique print on the tip of one of the fingers on either hand or can the print on the tip of one of the thumbs on either of the individual's hands. Upon receiving the fingerprint, the sensor detector 132 can determine what touch sensor, such as touch sensor 410, the fingerprint was received from and then send the fingerprint along with a touch sensor identifier to the processor 130. The processor 130 can then determine whether the detected fingerprint is already associated with the determined touch sensor and stored in the memory 134. For example, the processor 130 can access memory 134 and determine whether the detected fingerprint is already associated with touch sensor 410.

If the fingerprint is already associated with touch sensor 410, the processor can determine the input function to be performed when the fingerprint is detected on that touch sensor. The processor 130 can then provide a message, on display screen 104, to the user indicating that the fingerprint is already associated with touch sensor 410, and to identify the current input function to be performed when the fingerprint is detected in the touch sensor 410. The processor 130 can also provide the user with the GUI on the display screen 104 to enable the user to change the input function to be performed when the fingerprint is detected in touch sensor 410. Upon the user either re-saving the current input function or saving a new input function for the fingerprint in touch sensor 410, the processor 130 can provide a message to the user indicating that a new fingerprint can be received, and the substantially same process can be performed or the user can exit the training mode.

However, if the fingerprint is not already associated with or mapped to touch sensor 410, the processor 130 can provide the GUI on the display screen 104 to enable the user to select an the input function to be performed when the fingerprint is detected in touch sensor 410. Upon the user selecting and saving an input function for the fingerprint in touch sensor 410, the processor 130 can provide a message to the user indicating that a new fingerprint can be received. In an embodiment, the user can repeat this process until the user has stored a desired number of fingerprints for any combination of the touch sensors 410, 412, 510-514, and 520-524.

In an embodiment, the training mode for the touch sensors 410, 412, 510-514, and 520-524 of dock 400 can be universal across every application executed in the tablet computer 100, such that the same fingerprint detected in the same touch sensor can be the same input function for all applications executed in the tablet computer. In another embodiment, the training mode can be different for each application or can include an option to select particular applications to assign the detection of a fingerprint in a touch sensor to a particular input function to be performed, such that one fingerprint in the same touch sensor can be different input functions depending on the application executing in the tablet computer 100.

During normal operation, a user can hold the handles 402 and 404 of dock 400 in such a way that the user's fingers wrap around the tablet computer and rest near the touch sensors 510-514 and 520-524 on the back surface 202, and one of his or her thumbs to be near touch sensors 410 and 412. For example, the user can rest the loops 406 of the handles 402 and 404 on the user's hands to allow him or her to move his or her fingers without risk of dropping the dock 400 and tablet computer 100. The user can then use his or her fingerprints on the touch sensors 410, 412, 510-514, and 520-524 to perform different actions in an application running on the tablet computer 100. For example, touch sensor 524 can receive a fingerprint and can provide the fingerprint to sensor detector 132 via the I/O interfaces 440 and 135. The sensor detector 132 and processor 130 can then operate as described above to perform an input function associated with the detected fingerprint in touch sensor 524.

As shown in FIG. 5, touch sensor 510-514 and 520-524 are separate touch sensors. However, in an embodiment, touch sensors 510-514 can be individual zones of a single touch sensor, and touch sensors 520-524 can be individual zones of another touch sensor substantially similar to the touch sensors described above with respect to FIG. 3. In this embodiment, the sensor detector 132 can utilize a multiple touch event to assigned or set the different zones of the touch sensors on the handles 402 and 404 as described above.

Figure 6:
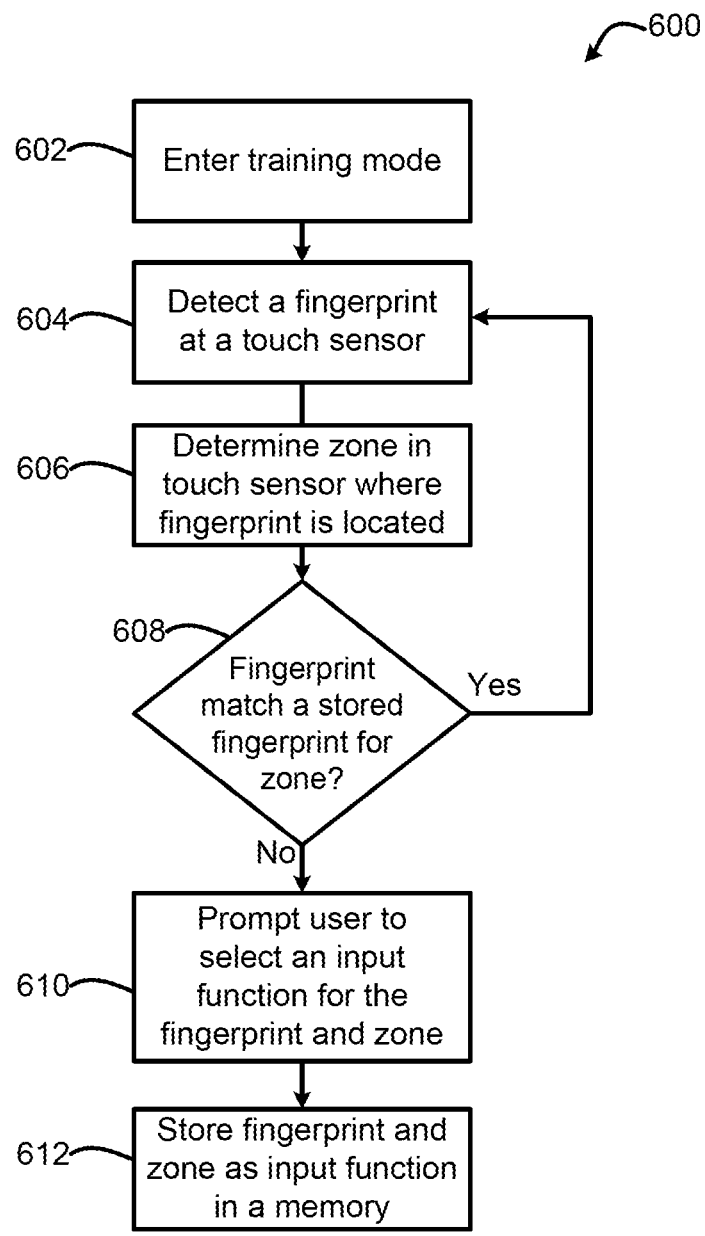
FIG. 6 is a flow diagram of a method for a training mode to associate fingerprints to an input function.

FIG. 6 shows a flow diagram of a method 600 for executing a training mode to associate fingerprints to an input function. The flow begins at block 602, during which an information handling system, such as a tablet computer, enters a training mode. In an embodiment, the training mode can be selected via a soft button on the tablet computer, by voice prompt, or the like. Additionally, the training mode can be entered into while the tablet computer is both connected to and not connected to a dock. At block 604, a fingerprint is detected at a touch sensor. In an embodiment, the touch sensor can be located on a rear panel of the tablet computer, on a rear panel of the dock connected to the tablet computer, on a front panel of the dock, or the like. The flow continues at block 606, and a particular zone of the touch sensor, which the fingerprint is detected, is determined. For example, the touch sensor can have three separate zones, and the fingerprint can be located in the third zone.

At block 608, a determination is made whether the fingerprint matches a stored fingerprint for the particular zone. In an embodiment, fingerprints that were previously received/detected during a training mode can be associated with the different zones of the touch sensor and can be stored in a memory of the tablet computer. In an embodiment, the same fingerprint can be associated with a different input function depending on which zone of the touch sensor the fingerprint is detected. In an embodiment, a processor can compare the detected fingerprint to each of the fingerprints, if any, that are stored in the memory and that are associated with the particular zone in which the fingerprint was detected. If the fingerprint matches a stored fingerprint for the particular zone, the flow continues as described above at block 604. However, if the fingerprint does not match a stored fingerprint for the particular zone, a prompt is provided to the user of the tablet computer requesting that the user select an input function for the fingerprint when detected in the particular zone. In an embodiment the input function can be an alphanumerical character of a keyboard, an action in a video game application, a sequence of actions in the videogame application, or the like. At block 610, the fingerprint is stored, in a memory, as being associated with the selected input function when the fingerprint is detected in the particular zone of the touch sensor.

Figure 7:
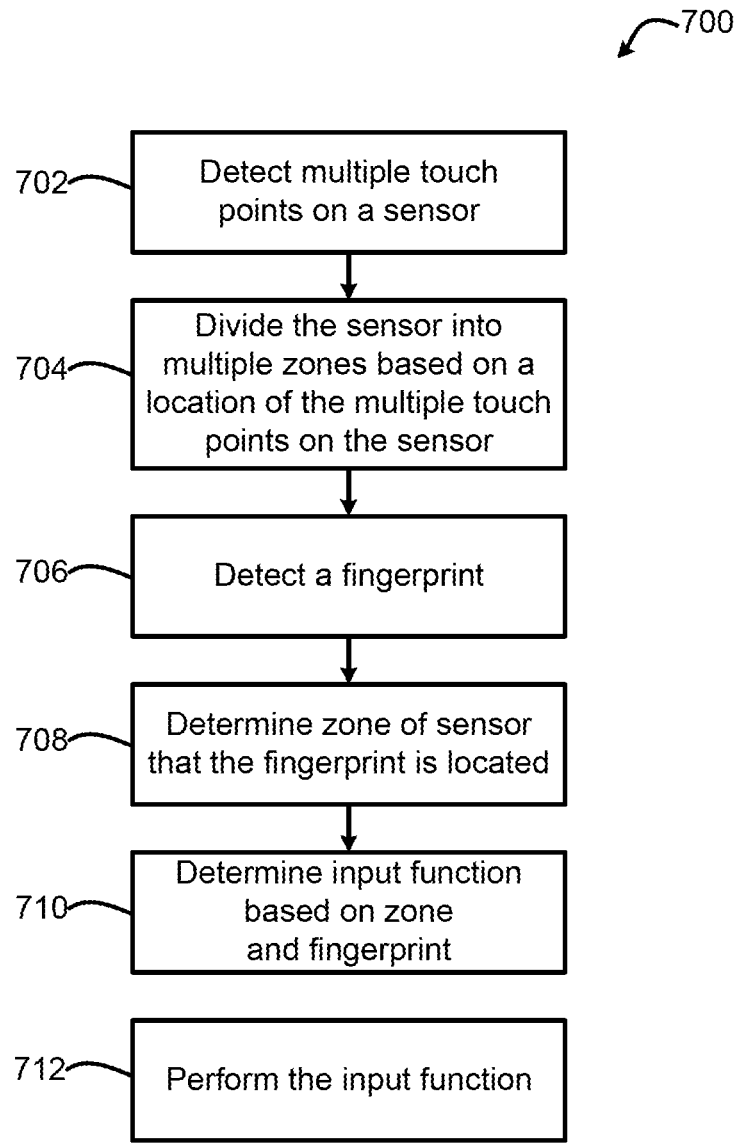
FIG. 7 is a flow diagram of a method for performing an input function in response to a detected fingerprint.

FIG. 7 shows a flow diagram of a method 700 for performing an input function in response to a detected fingerprint. In an embodiment, the method 700 can be used in conjunction with the method 600 described above. For example, method 600 can be executed prior to method 700 been executed, at any point while method 700 is being executed, or the like.

At block 702, a multiple touch event is detected. In an embodiment, the multiple touch event can be registered on a touch sensor and detected by a sensor detector of the of a tablet computer. The multiple touch event can detected when more than one fingerprint is received at the touch sensor. In an embodiment, the touch sensor can be located on the rear panel of a tablet computer, a rear panel of a dock connected to the tablet computer, a front panel of the dock, or the like. At block 704, the touch sensor can be divided into multiple zones the based on the location of the multiple touch event. In an embodiment, the touch sensor can be divided into three separate zones, and the center zone can be located in a vertical orientation along the touch sensor where the multiple touch event was detected. An additional zone can be identified/defined on each side of the center zone. In this embodiment, the multiple touch event and location thereof can set a resting place for the user's hands on the touch sensor so that the touch sensor can be optimized for the user and the center zone of the touch sensor is located at the resting location of the user's hands. Thus, depending on the size of the user's hands, the center zone of the touch sensor can be adjusted closer to or further away from an edge of the tablet computer.

At block 706, a fingerprint is detected on the touch sensor. The flow then proceeds to block 708, and a zone that the fingerprint is detected in is determined. An input function for the fingerprint is determined based on the zone of the touch sensor at block 710. In an embodiment, the same fingerprint can be associated with a different input function depending on which zone of the touch sensor the fingerprint is detected. In an embodiment, a processor can compare the detected fingerprint to each of the fingerprints, if any, that are stored in a memory and that are associated with the zone in which the fingerprint was detected. At block 712, the determined input function is performed.

Figure 8:
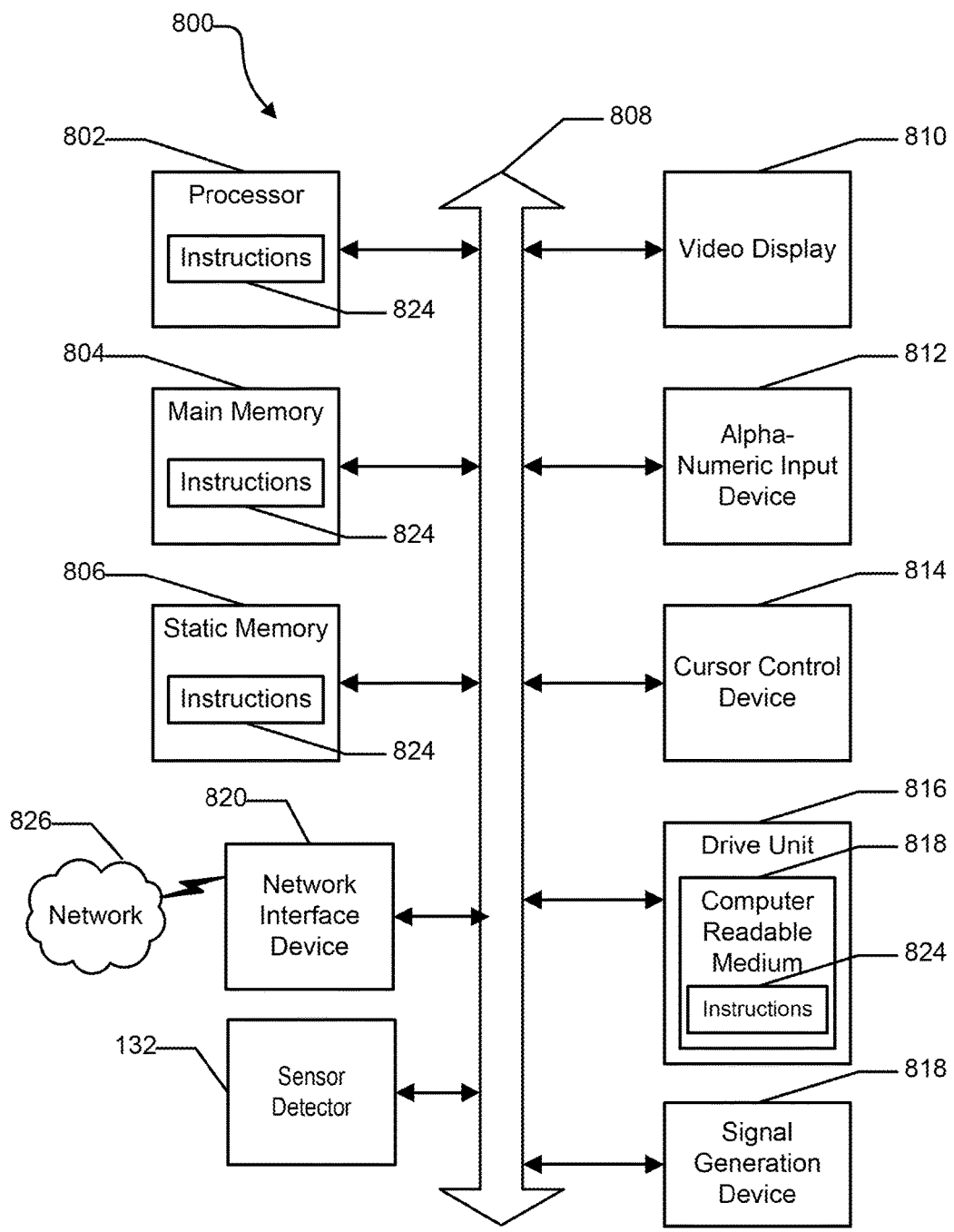
FIG. 8 is a block diagram of an information handling system according to an embodiment of the present disclosure.

FIG. 8 shows an information handling system 800 according to a specific embodiment of the present disclosure. The information handling system 800 may include a processor 802 such as a central processing unit (CPU), a graphics processing unit (GPU), or both. Moreover, the information handling system 800 can include a main memory 804 and a static memory 806 that can communicate with each other via a bus 808. As shown, the information handling system 800 may further include a video display unit 810, such as a liquid crystal display (LCD), an organic light emitting diode (OLED), a flat panel display, a solid state display, or a cathode ray tube (CRT). Additionally, the information handling system 800 may include an input device 812, such as a keyboard, and a cursor control device 814, such as a mouse. The information handling system 800 can also include a disk drive unit 816, a signal generation device 818, such as a speaker or remote control, and a network interface device 820 to provide communications over a network 826. Information handling system also includes the sensor detector 132.

The information handling system 800 can include a set of instructions that can be executed to cause the computer system to perform any one or more of the methods or computer based functions disclosed herein. The computer system 800 may operate as a standalone device or may be connected such as using a network, to other computer systems or peripheral devices.

In a networked deployment, the information handling system 800 may operate in the capacity of a server or as a client user computer in a server-client user network environment, or as a peer computer system in a peer-to-peer (or distributed) network environment. The information handling system 800 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single information handling system 800 is illustrated, the term "system" shall also be taken to include any collection of systems or sub-systems that individually or jointly execute a set, or multiple sets, of instructions to perform one or more computer functions.

The disk drive unit 816 may include a computer-readable medium 822 in which one or more sets of instructions 824 such as software can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the information handling system 800. The main memory 804 and the processor 802 also may include computer-readable media. The network interface device 820 can provide connectivity to a network 826, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal; so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    detecting a first fingerprint on a touch sensor of an information handling system, wherein the touch sensor is divided into a plurality of non-overlapping zones;
    determining a first input function associated with the first fingerprint based on the first fingerprint being located within a first zone of the non-overlapping zones; and
    executing, by the information handling system, the first input function.

2. The method of claim 1, further comprising:
    detecting a multiple touch event on the touch sensor; and
    setting different non-overlapping zones in the touch sensor based on a location of the multiple touch event on the touch sensor.

3. The method of claim 1, further comprising:
    performing a training mode, wherein the training mode includes:
        detecting a second fingerprint on the touch sensor;
        determining that the second fingerprint is within a second zone of the non-overlapping zones;
        determining whether the second fingerprint matches a stored fingerprint associated with the second zone of the non-overlapping zones;
        in response to the second fingerprint not matching a stored fingerprint associated with the second zone of the non-overlapping zones, prompting the user to select a second input function for the second fingerprint; and
        storing the second input function for the second fingerprint in the second zone.

4. The method of claim 1, wherein the information handling system includes a tablet computer and a dock.

5. The method of claim 4, wherein the touch sensor is located on a rear surface of the tablet computer.

6. The method of claim 4, wherein the touch sensor is located on a rear surface of the dock.

7. The method of claim 1, wherein the first input function is selected from a group consisting of an alphanumeric character of a keyboard and an action in a video game application.

8. An information handling system comprising:
    a tablet computer, the tablet computer including:
        a touch sensor divided into a plurality of non-overlapping zones;
        a sensor detector configured to communicate with the touch sensor, the sensor detector configured to detect a first fingerprint on the touch sensor; and
        a processor configured to communicate with the sensor detector, the processor configured to determine that the first fingerprint is within a first zone of non-overlapping zones, to determine a first input function associated with the first fingerprint based on the first fingerprint being located in the first zone of the non-overlapping zones, and to execute the first input function.

9. The information handling system of claim 8, wherein sensor detector is further configured to detect a multiple touch event on the touch sensor, and the processor is further configured to set different non-overlapping zones in the touch sensor based on a location of the multiple touch event on the touch sensor.

10. The information handling system of claim 8, wherein the processor is further configured execute a training mode, during the training mode the sensor detector is configured to detect a second fingerprint on the touch sensor, and the processor is configured to determine that the second fingerprint is within a second zone of the non-overlapping zones, to determine whether the second fingerprint matches a stored fingerprint associated with the second zone of the non-overlapping zones, in response to the second fingerprint not matching a stored fingerprint associated with the second zone of the non-overlapping zones, to prompt the user to select a second input function for the second fingerprint, and to store the second input function for the second fingerprint in the second zone.

11. The information handling system of claim 8, wherein the touch sensor is located on a rear surface of the tablet computer.

12. The information handling system of claim 11, wherein the touch sensor is an optical sensor to detect fingerprints.

13. The information handling system of claim 8, wherein the first input function is selected from a group consisting of an alphanumeric character of a keyboard and an action in a video game application.

14. An information handling system comprising:
a dock including:
  a cradle configured to hold a tablet computer within the dock;
  first and second handles in physical communication with the cradle; and
  a first touch sensor in physical communication with a first surface of the first handle, the first touch sensor including a plurality of non-overlapping zones, the first touch sensor configured to receive a first fingerprint and to provide the first fingerprint and a location of the first fingerprint on the non-overlapping zones of the first touch sensor to the tablet computer, wherein the first fingerprint is associated with a first input function for the tablet computer based on the first fingerprint being located at a first location of the non-overlapping zones.

15. The information handling system of claim 14, wherein the dock further includes:
  a second touch sensor in physical communication with a second surface of the first handle.

16. The information handling system of claim 15, wherein the first and second surfaces are opposing surfaces of the first handle.

17. The information handling system of claim 14, further comprising:
  the tablet computer configured to communicate with the dock, the tablet computer including:
    a sensor detector configured to communicate with the first touch sensor, the sensor detector configured to detect the first fingerprint on the first touch sensor; and
    a processor configured to communicate with the sensor detector, the processor configured to determine that the first fingerprint is within the first location of the non-overlapping zones, to match the first fingerprint to a stored fingerprint for the first location, to determine the first input function associated with the first fingerprint based on the first fingerprint matching the stored fingerprint for the first location, and to execute the first input function.

18. The information handling system of claim 14, wherein sensor detector is further configured to detect a multiple touch event on the first touch sensor, and the processor is further configured to set different non-overlapping zones in the first touch sensor based on a location of the multiple touch event on the first touch sensor.

19. The information handling system of claim 14, wherein the processor is further configured execute a training mode, during the training mode the sensor detector is configured to detect a second fingerprint on the first touch sensor, and the processor is configured to determine that the second fingerprint is within the second location of the non-overlapping zones, to determine whether the second fingerprint matches a stored fingerprint associated with the second location of the non-overlapping zones, in response to the second fingerprint not matching a stored fingerprint associated with the second location of the non-overlapping zones, to prompt the user to select the second input function for the second fingerprint, and to store the second input function for the second fingerprint in the second location.

20. The information handling system of claim 14, wherein the first input function is selected from a group consisting of an alphanumeric character of a keyboard and an action in a video game application.

\* \* \* \* \*